United States Patent
Ding et al.

(10) Patent No.: US 11,733,474 B2
(45) Date of Patent: Aug. 22, 2023

(54) LENS MODULE AND ELECTRONIC DEVICE USING THE SAME

(71) Applicant: TRIPLE WIN TECHNOLOGY (SHENZHEN) CO. LTD., Shenzhen (CN)

(72) Inventors: Sheng-Jie Ding, Guangdong (CN); Shin-Wen Chen, New Taipei (TW); Jing-Wei Li, Guangdong (CN); Jian-Chao Song, Guangdong (CN); Yu-Shuai Li, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 911 days.

(21) Appl. No.: 16/583,560

(22) Filed: Sep. 26, 2019

(65) Prior Publication Data

US 2021/0011247 A1 Jan. 14, 2021

(30) Foreign Application Priority Data

Jul. 8, 2019 (CN) .......................... 201910609831.1

(51) Int. Cl.
*G02B 7/02* (2021.01)
*G02B 5/00* (2006.01)
*G02B 7/00* (2021.01)

(52) U.S. Cl.
CPC ............. *G02B 7/006* (2013.01); *G02B 5/003* (2013.01); *G02B 7/02* (2013.01)

(58) Field of Classification Search
CPC ...... G02B 7/006; G02B 7/02; G02B 27/0006; H01L 27/14618; H01L 27/14625; H04N 5/2171; H04N 5/2253; H04N 5/2254
See application file for complete search history.

(56) References Cited

U.S. PATENT DOCUMENTS

| | | | | |
|---|---|---|---|---|
| 7,513,704 B2* | 4/2009 | Takagi | ................... | G02B 7/006 250/559.08 |
| 7,786,429 B2* | 8/2010 | Glenn | ............... | H01L 27/14687 257/434 |
| 8,553,343 B2* | 10/2013 | Fujinaka | ................ | G03B 17/04 396/458 |
| 2011/0102652 A1* | 5/2011 | Lu | .......................... | H04N 23/54 348/294 |
| 2016/0165108 A1* | 6/2016 | Jang | ........................ | H04N 23/57 348/374 |
| 2018/0299591 A1* | 10/2018 | Wei | ..................... | G02B 27/0018 |
| 2018/0321463 A1* | 11/2018 | Staley | .................. | G02B 27/141 |

FOREIGN PATENT DOCUMENTS

| CN | 109151261 A | 1/2019 |
|---|---|---|
| CN | 109873930 A | 6/2019 |
| TW | 201741753 A | 12/2017 |

* cited by examiner

*Primary Examiner* — Nicholas R. Pasko
(74) *Attorney, Agent, or Firm* — ScienBiziP, P.C.

(57) ABSTRACT

A thinned lens module with high imaging quality comprises a base, an optical filter, and a metal sheet. The base defines a first receiving groove and a second receiving groove communicating with the first receiving groove. The metal sheet is received in the first receiving groove and fixed to a sidewall of the first receiving groove. The optical filter is received in the second receiving groove and fixed on the metal sheet. An electronic device including the lens module is also disclosed.

12 Claims, 6 Drawing Sheets

LENS MODULE AND ELECTRONIC DEVICE USING THE SAME

FIELD

The subject matter herein generally relates to optical devices, and more particularly to a lens module and an electronic device including the same.

BACKGROUND

A camera module of a cellphone usually includes a lens, an optical filter, an image sensor, a support bracket, a base, and a circuit board. The optical filter is disposed between the lens and the image sensor, and is supported by the support bracket. Usually, the support bracket and base are integrally formed via an injection molding process. The support bracket requires a sufficient thickness to support and protect the fragile optical filter, and an ink layer needs be coated on the optical filter to block out stray light reflected from a chamfered portion of the support bracket.

BRIEF DESCRIPTION OF THE DRAWINGS

Implementations of the present technology will now be described, by way of embodiment, with reference to the attached figures.

DETAILED DESCRIPTION

Figure 1:
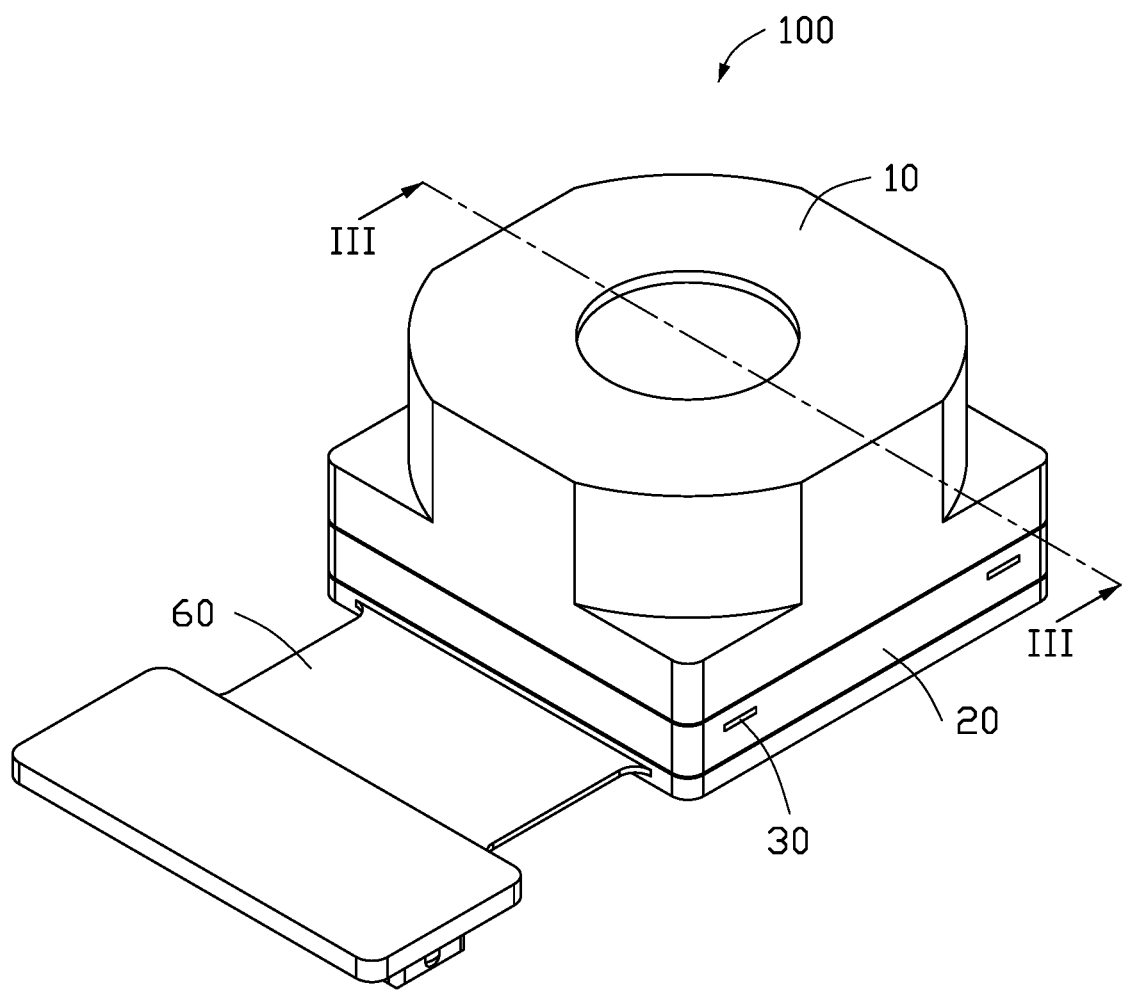
FIG. 1 is an isometric view of an embodiment of a lens module.
Figure 2:
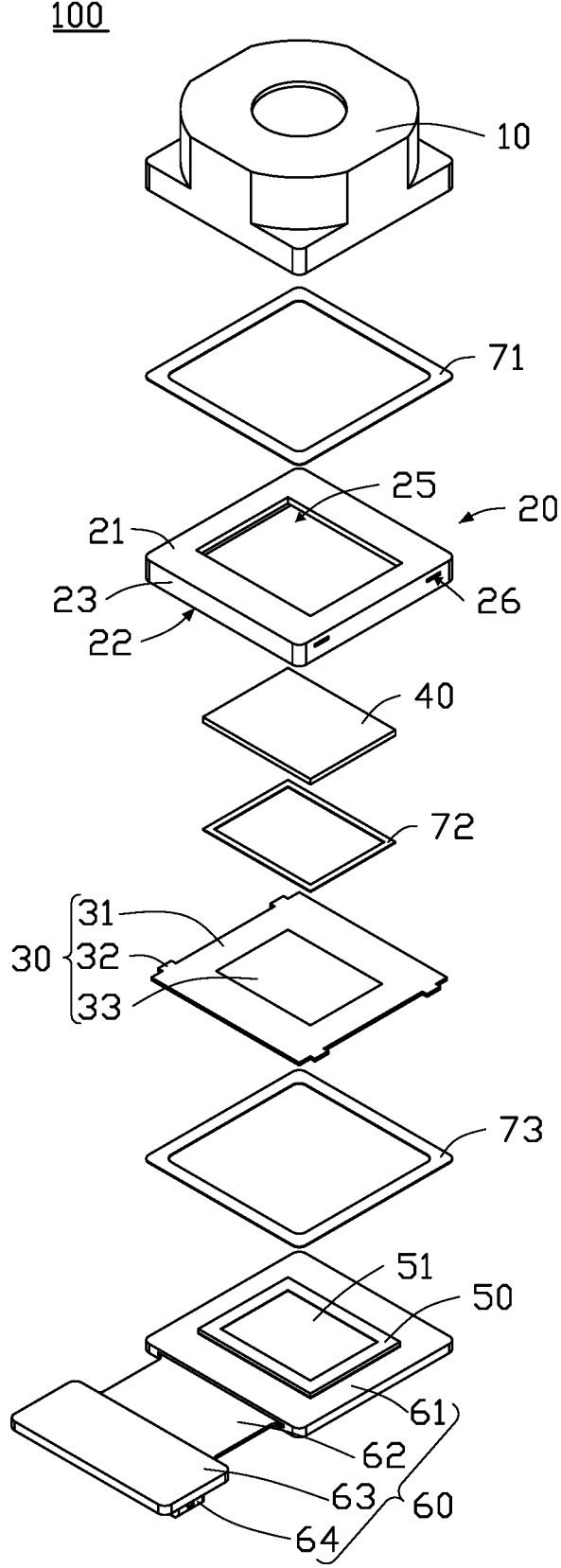
FIG. 2 is an exploded, isometric view of the lens module of FIG. 1.
Figure 3:
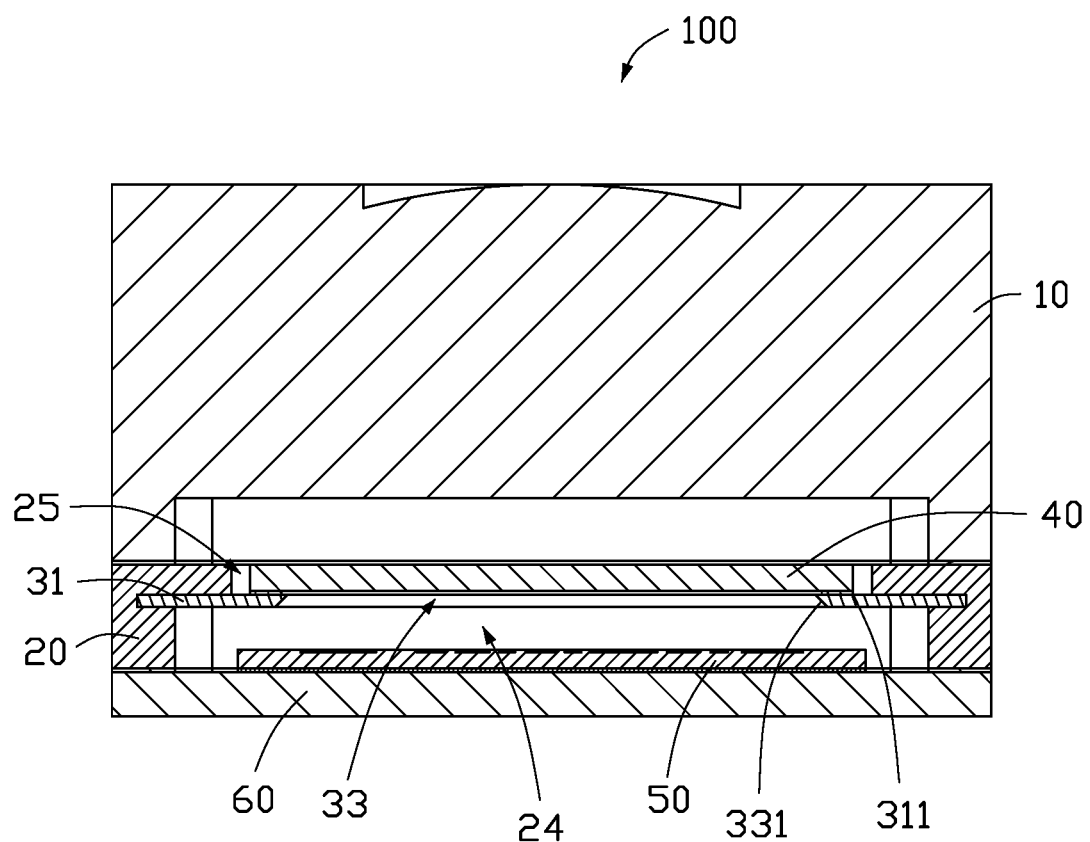
FIG. 3 is a cross-sectional view along line III-III of FIG. 1.
Figure 4:
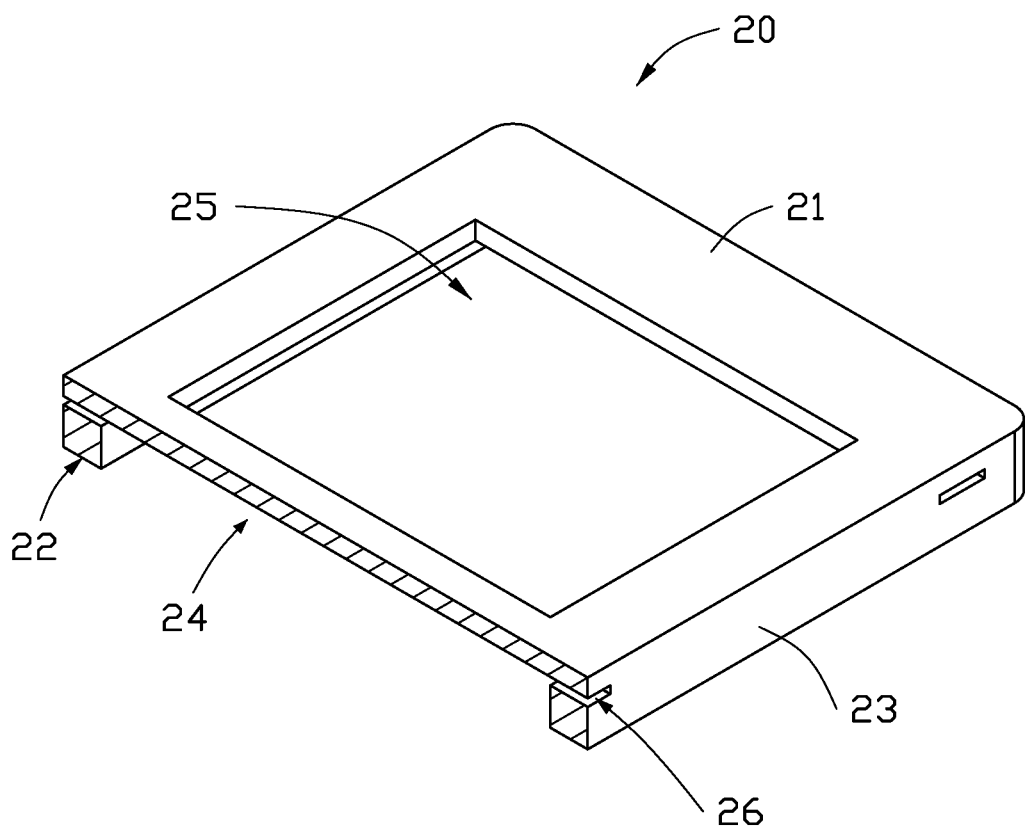
FIG. 4 is a cross-sectional view of a base in FIG. 2.
Figure 5:
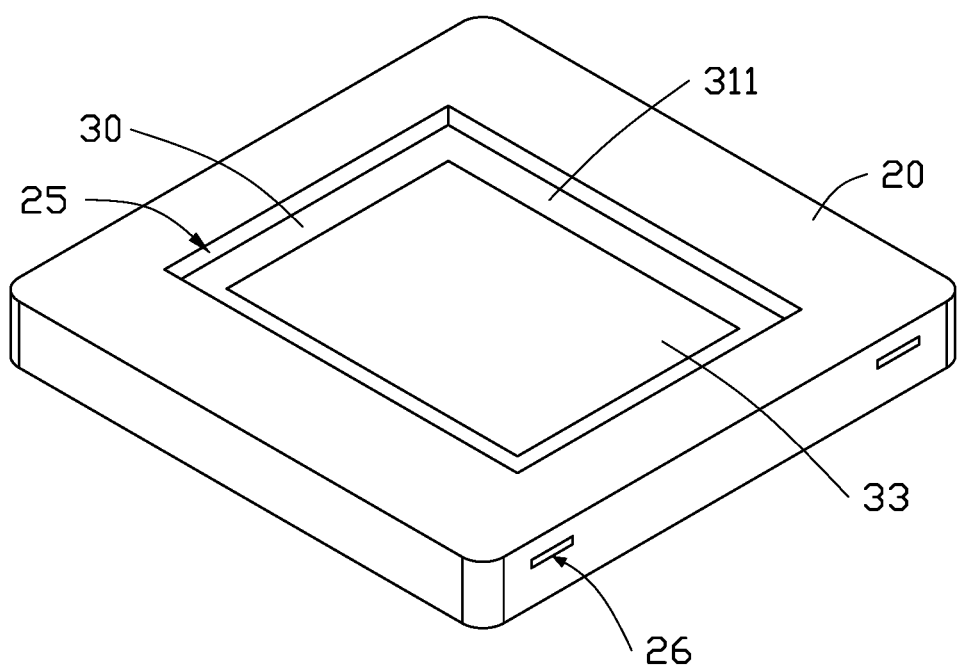
FIG. 5 is an isometric view of a base and a metal sheet embedded therein in the module of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIGS. 1-5 illustrate a lens module in one embodiment (lens module 100). The lens module 100 including a lens 10, a base 20, a metal sheet 30, an optical filter 40, an image sensor, and a circuit board 60. The lens 10 is fixed on the base 20. The base 20 is fixed on the circuit board 60. The metal sheet 30 is fixed in the base 20. The optical filter 40 is received in the base 20 and is fixed on the metal sheet 30. The image sensor 50 is arranged on the circuit board 60, is received in the base 20, and faces towards the optical filter 40.

The lens 10 is fixed on the base 20 via a first adhesive layer 71. The optical filter 40 is fixed on the metal sheet 30 via a second adhesive layer 72. The base 20 is fixed on the circuit board 60 via a third adhesive layer 73.

The base 20 including a first surface 21, a second surface 22 opposite to the first surface 21, and a plurality of side faces 23 connecting the first surface 21 and the second surface 22. The side faces 23 are successively connected. The base 20 includes four side faces 23, the four side faces 23 are vertically connected to the first surface 21 and the second surface 22.

A portion of the second surface 22 is recessed towards the first surface 21 to form a first receiving groove 24. A portion of the first surface 21 is recessed towards the second surface 22 to form a second receiving groove 25. The second receiving 25 communicates with the first receiving groove 24. A size of the first receiving groove 24 is not less than a size of the second receiving groove 25.

Portions of sidewalls of the first receiving groove 24 are recessed towards a side face 23 to form at least two fixing holes 26. The fixing holes 26 communicate with the first receiving groove 24. There are four fixing holes 26 defined on two sides of the base 20 and passing through the side faces 23. The fixing holes 26 are adjacent to the bottom of the first receiving groove 24.

The metal sheet 30 includes a main body 31 and at least two fixing blocks 32 arranged on one or both ends of the main body 31. Each fixing block 32 is received and fixed in a fixing hole 26.

The metal sheet 30 defines a through hole for light (light through hole 33) on the main body 31. A part of the main body 31 and the light through hole 33 are exposed from the second receiving groove 25. The main body 31 includes a third surface 311 parallel to the first surface 21. The optical filter 40 is fixed on the third surface 311.

The hole wall 331 of the light through hole 33 intersects with the third surface 311, an intersection of the hole wall 331 and the third surface 311 is a sharp corner.

The metal sheet 30 is treated by a black anodized finish, thereby a black oxide film is coated on surfaces of the metal sheet 30.

The optical filter 40 is configured to filter out stray light entering the lens module 100. The optical filter 40 is received in the second receiving groove 25, is fixed on the main body 31, and faces towards the lens 10.

The image sensor 50 is fixed on the circuit board 60 and received in the first receiving groove 24. The image sensor 50 faces the optical filter 40, and is aligned with the optical filter 40. The image sensor 50 is electrically connected to the circuit board 60 via a metal wire. A size of a photosensitive area of the image sensor 50 is less than or equal to a size of the light through hole 33.

The circuit board 60 can be a ceramic board, a flexible board, a rigid board, or a rigid-flexible board. In one embodiment, the circuit board 60 is a rigid-flexible board that includes a first rigid board portion 61, a second rigid board portion 62, and a flexible board portion 63 arranged between the first rigid board portion 61 and the second rigid board portion 62. The image sensor 50 is fixed on the first rigid board portion 61. The base 20 is fixed on the first rigid board portion 61. The first rigid board portion 61 further carries a plurality of electronic components surrounding the image sensor 50. The electronic components can be all or some of resistor, capacitor, diode, triode, relay, or live erasable programmable read only memory (EEPROM). The second rigid board portion 62 further carries a connection portion 64. The connection portion 64, the electronic components, and the image sensor 50 can be on same or different surfaces of the circuit board 60. The connection portion 64 can be a gold fingers connector (edge connector) or other connector.

Figure 6:
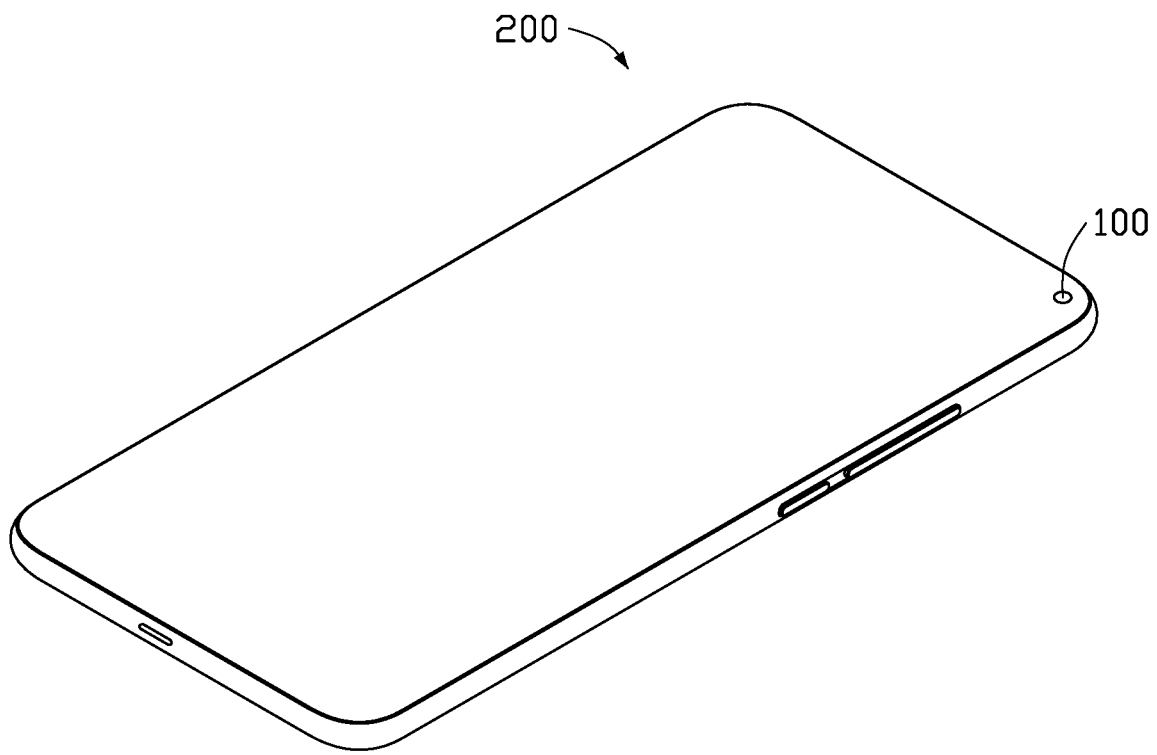
FIG. 6 is an isometric view of an embodiment of an electronic device including the lens module of FIG. 1.

FIG. 6 illustrates an electronic device 200 including the said lens module 100. The electronic device 200 can be any electronic device having imaging capturing functions, such as mobile phones, wearable devices, computer devices, vehicles, or monitoring devices.

The lens module 100 and the electronic device 200 use the metal sheet 30 received in and fixed to the base 20 to replace the support bracket found in the prior art, which not only reduces a thickness of the lens module 100, but also enhances a strength of support portion for supporting the optical filter 40. The metal sheet 30 with a black anodized finish blocks out stray light, thus a coating of ink on the optical filter can be omitted, and a production cost of the lens module can be reduced. The intersection of the hole wall 311 of the light through hole 33 and the third surface 311 is a sharp corner, to avoid reflection of incident light onto or from the intersection, and the imaging quality is improved.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A lens module comprising:
a base defining a first receiving groove, a second receiving groove communicating with the first receiving groove, and at least two fixing holes penetrating sidewalls of the first receiving groove to communicate with the first receiving groove;
an image sensor received in the first receiving groove;
a metal sheet comprising a main body received in the first receiving groove and at least two fixing blocks arranged on the main body and received and fixed in the at least two fixing holes, the main body located above the image sensor; and
an optical filter received in the second receiving groove and supported on a surface of the main body facing away from the image sensor, the optical filter being aligned with the image sensor.

2. The lens module of claim 1, wherein surfaces of the metal sheet are coated with a black oxide film.

3. The lens module of claim 1, wherein the lens module further comprises a lens, the lens is fixed on the base, the optical filter faces towards the lens.

4. The lens module of claim 1, wherein the base comprises a first surface, a second surface opposite to the first surface, and a plurality of side faces connecting the first surface and the second surface, wherein a portion of the second surface is recessed towards the first surface to form the first receiving groove, a portion of the first surface is recessed towards the second surface to form the second receiving groove, and portions of sidewalls of the first receiving groove are recessed towards a corresponding one of the side faces to form the at least two fixing holes.

5. The lens module of claim 4, wherein the main body defines a light through hole, a part of the main body and the light through hole are exposed from the second receiving groove, the main body comprises a third surface parallel to the first surface, the optical filter is fixed and supported on the third surface.

6. The lens module of claim 5, wherein the lens module further comprises a circuit board, the base is fixed on the circuit board, the image sensor is arranged on and electrically connected to the circuit board.

7. An electronic device comprising a lens module, the lens module comprising:
a base defining a first receiving groove a second receiving groove communicating with the first receiving groove, and at least two fixing holes penetrating sidewalls of the first receiving groove to communicate with the first receiving groove;
an image sensor received in the first receiving groove;
a metal sheet comprising a main body received in the first receiving groove and at least two fixing blocks arranged on the main body and received and fixed in the at least two fixing holes, the main body located above the image sensor; and
an optical filter received in the second receiving groove and supported on a surface of the main body facing away from the image sensor, the optical filter being aligned with the image sensor.

8. The electronic device of claim 7, wherein surfaces of the metal sheet are coated with a black oxide film.

9. The electronic device of claim 7, wherein the lens module further comprises a lens, the lens is fixed on the base, the optical filter faces towards the lens.

10. The electronic device of claim 7, wherein the base comprises a first surface, a second surface opposite to the first surface, and a plurality of side faces connecting the first surface and the second surface, wherein a portion of the second surface is recessed towards the first surface to form the first receiving groove, a portion of the first surface is recessed towards the second surface to form the second receiving groove, and portions of sidewalls of the first receiving groove are recessed towards a corresponding one of the side faces to form the at least two fixing holes.

11. The electronic device of claim 10, wherein the main body defines a light through hole, a part of the main body and the light through hole are exposed from the second receiving groove, the main body comprises a third surface parallel to the first surface, the optical filter is fixed and supported on the third surface.

12. The electronic device of claim 11, wherein the lens module further comprises a circuit board, the base is fixed the circuit board, the image sensor is arranged on and electrically connected to the circuit board.

\* \* \* \* \*